Jan. 11, 1955 T. VIGMOSTAD 2,698,959
DECK LID HINGE

Filed Aug. 7, 1951 3 Sheets-Sheet 1

INVENTOR.
Trygve Vigmostad
BY
Elmer Jamison Gray
ATTORNEY.

Jan. 11, 1955  T. VIGMOSTAD  2,698,959
DECK LID HINGE
Filed Aug. 7, 1951  3 Sheets-Sheet 2
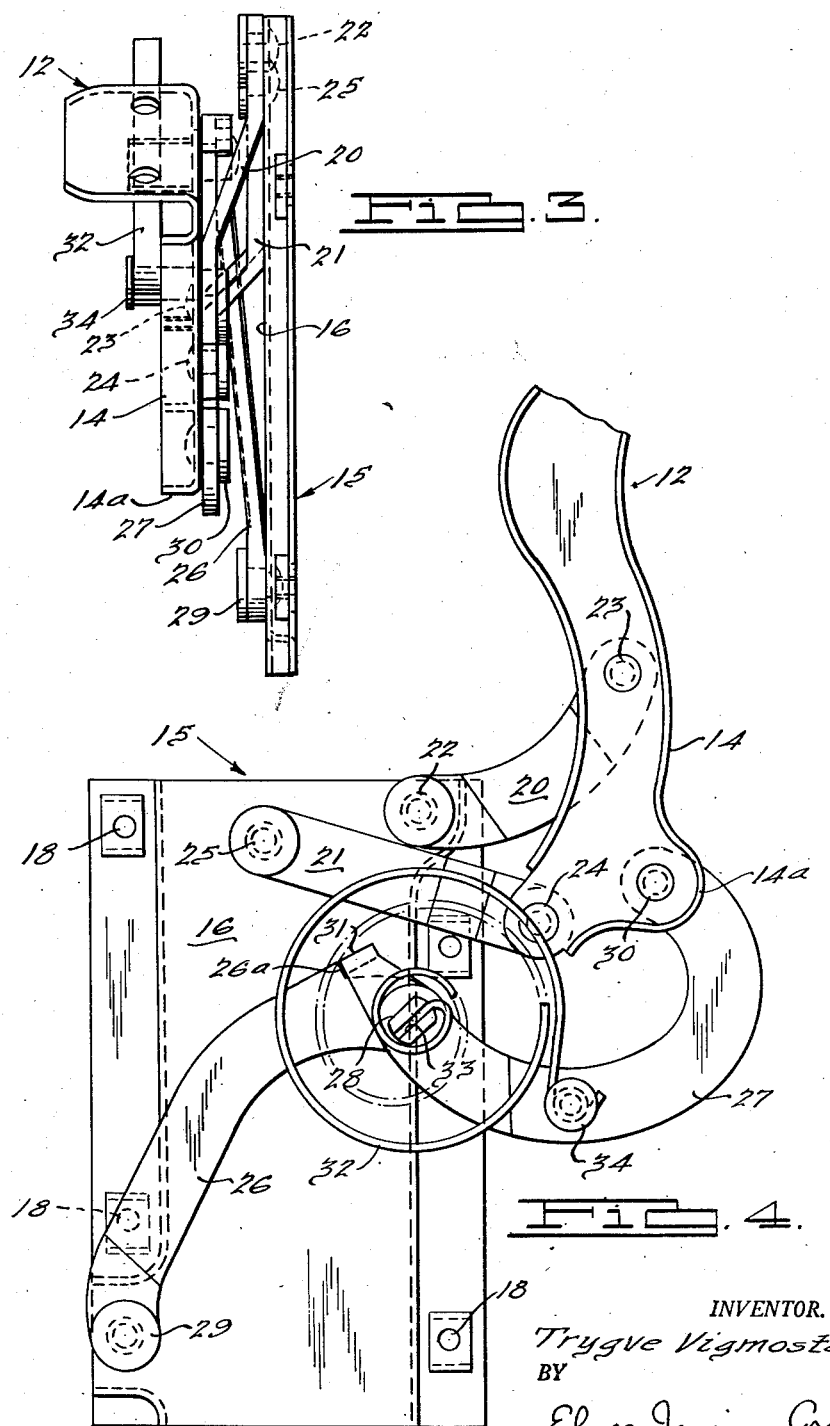
INVENTOR.
Trygve Vigmostad.
BY
Elmer Jamison Gray
ATTORNEY.

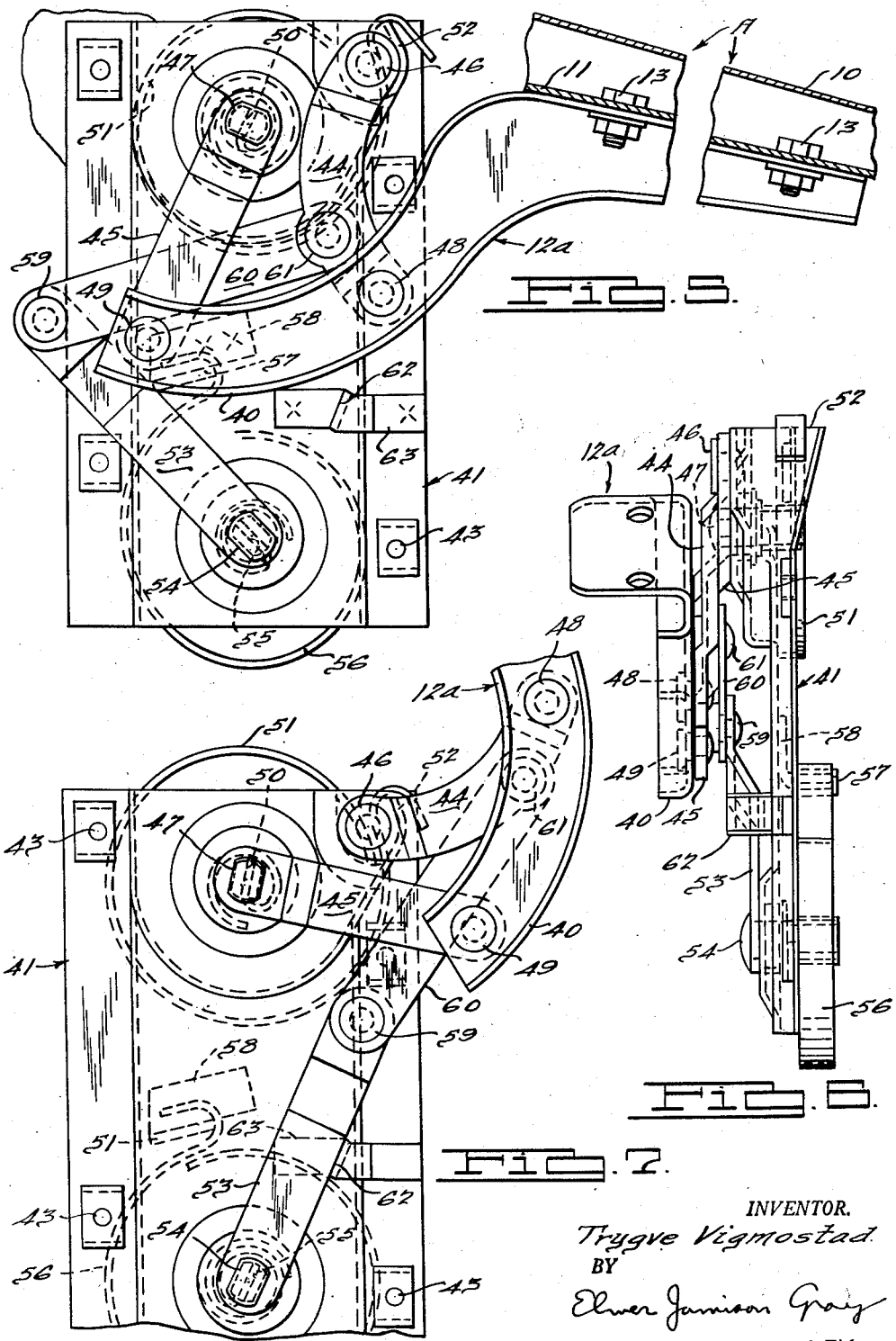

United States Patent Office 2,698,959
Patented Jan. 11, 1955

2,698,959

DECK LID HINGE

Trygve Vigmostad, Detroit, Mich., assignor to Briggs Manufacturing Co., Detroit, Mich., a corporation of Michigan Application August 7, 1951, Serial No. 240,680

15 Claims. (Cl. 16—163)

This invention relates to a hinge device which is particularly but not exclusively adapted for hingedly connecting an automobile rear deck lid to the vehicle body.

An object of the invention is to provide an improved compact hinge device of simplified, economical construction for a swinging member, such as an automobile rear deck lid, which is particularly efficient in operation and which occupies a minimum space in the vehicle storage compartment.

A further object of the invention is to provide such a hinge device having improved means for counterbalancing the lid during opening and closing thereof and which incorporates simple and improved means for holding the lid in the open or raised position without recourse to the usual deck lid stay or like supporting means, yet which permits the lid to be readily and simply closed without the necessity of first breaking a toggle joint or releasing a stay or other support as customarily employed to hold a vehicle rear deck lid in the raised position.

Another object is to provide an improved hinge structure which is particularly adapted for use with a rear deck lid of considerable curvature, and which will swing the lid bodily rearward from the vehicle and simultaneously upward to a raised position, whereby a curved lid may be raised with a minimum of overall forward swinging, thus eliminating the usual difficulty of avoiding contact between the curved lid in the raised position and upper portions of the vehicle body.

Another and more specific object is to provide a simple and improved hinge device of the foregoing character comprising a hinge arm rigidly secured to an automobile rear deck lid, the hinge arm at the closed position of the lid extending generally horizontally forward and being suspended from the body by a pair of generally upright swinging hinge links, one rearward of the other and each pivotally connected at its upper end to the body and at its lower end to the hinge arm. Cooperating with the swinging hinge links and serving as an approximate counterbalance for the weight of the lid during opening and closing movement is a toggle comprising a counterbalancing link pivotally connected to a connecting link, the counterbalancing link being also pivotally connected to the body at a location below the aforesaid swinging links and the connecting link being pivotally connected to one of the swinging members of the hinge device to swing the lid from the closed position to the open position upon corresponding movement of the toggle from a folded condition almost to a straightened condition. A torsion spring engaged with the toggle links yieldingly urges the same from the folded condition to said almost straightened condition, whereat the toggle leverage is effective to hold the lid surely and safely in the open or raised position. By such a construction, as the lid is moved from open to closed position, the effective weight of the lid tending to swing the same to closed position gradually decreases. Likewise the counterbalancing leverage of the folding toggle links gradually decreases, permitting opening and closing of the lid with minimum manual effort.

Other objects of this invention will appear on the following description and appended claims, reference being had to the accompanying drawings forming a part of this specification wherein like reference characters designate corresponding parts in the several views.

Fig. 3 is a rear view of the structure shown in Fig. 2, the lid being removed from the hinge arm.

Fig. 4 is a view similar to Fig. 2, showing the hinge structure in the raised or open position of the lid.

Fig. 5 is a view similar to Fig. 2, but showing a modification of the present invention.

Fig. 6 is a rear view of the structure shown in Fig. 5, the lid being removed from the hinge arm.

Fig. 7 is a view similar to Fig. 5, showing the hinge structure in the raised or open position.

Figure 1:
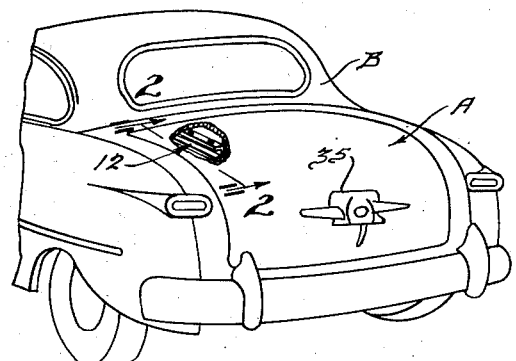
Fig. 1 is a fragmentary perspective view showing the rear end of a vehicle body having a rear deck lid hingedly mounted thereon in accordance with one embodiment of the present invention, portions of the deck lid being broken away to show the location of the hinge structure.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, details of one embodiment and application of the present invention are illustrated by way of example with a hinge device employed to mount a conventional automobile rear deck lid A on a vehicle body B. Preferably two similar hinge devices for the lid A are employed, one near each side of the body B and substantially the same in structure and operation as the other. Accordingly details of the device at the left side of the vehicle only are shown and discussed herein.

The deck lid A comprises in the present instance spaced outer and inner sheet metal panels 10 and 11 and a pair of laterally spaced hinge arms 12. Each arm 12 is rigidly bolted to the inner panel 11 by bolts 13 adjacent the forward upper edge of the deck lid and is formed with an offset portion 14 which extends generally horizontally forward at a level below the bolts 13 when the lid is in closed position. Each hinge device is supported by means of a bracket 15 having an embossment or pivot supporting plate 16 extending in a generally longitudinal vertical plane. The bracket 15 is secured to a rigid vertical bracket element 17 of the body structure by a plurality of bolts 18 and clinch nuts 19, Figs. 2 and 3.

Each hinge arm extension 14 is hingedly connected to the associated pivot supporting plate 16 on the same side of the vehicle by means of a pair of swinging links of approximately equal length, including a rearward link 20 and a forward link 21. When the lid is in closed position, the link 20 extends generally vertically and is pivotally secured at its upper end to the upper rearward portion of the plate 16 by a flanged pivot 22. The lower end of the link 20 is pivotally secured to the offset hinge arm extension 14 by a flanged pivot 23. The link 21 is pivotally connected at its lower end to the forward end of extension 14 by means of a flanged pivot 24 and inclines steeply rearward when the deck lid is in closed position, Fig. 2. The link 21 is also pivotally connected at its upper end to the plate 16 by means of a flanged pivot 25 at a location somewhat below and forward of the pivot 22.

The dimensions of the links 20, 21 and the locations of their respective pivotal connections with the plate 16 and hinge arm extension 14 are determined so that upon rearward swinging of these links about the fixed axes of their respective pivots 22 and 25, the hinge arm extension 14 will be swung bodily rearward and counterclockwise through an appreciable arc to the open or raised position, Fig. 4, whereat the link 20 inclines slightly rearward and the link 21 declines slightly rearward.

Figure 2:
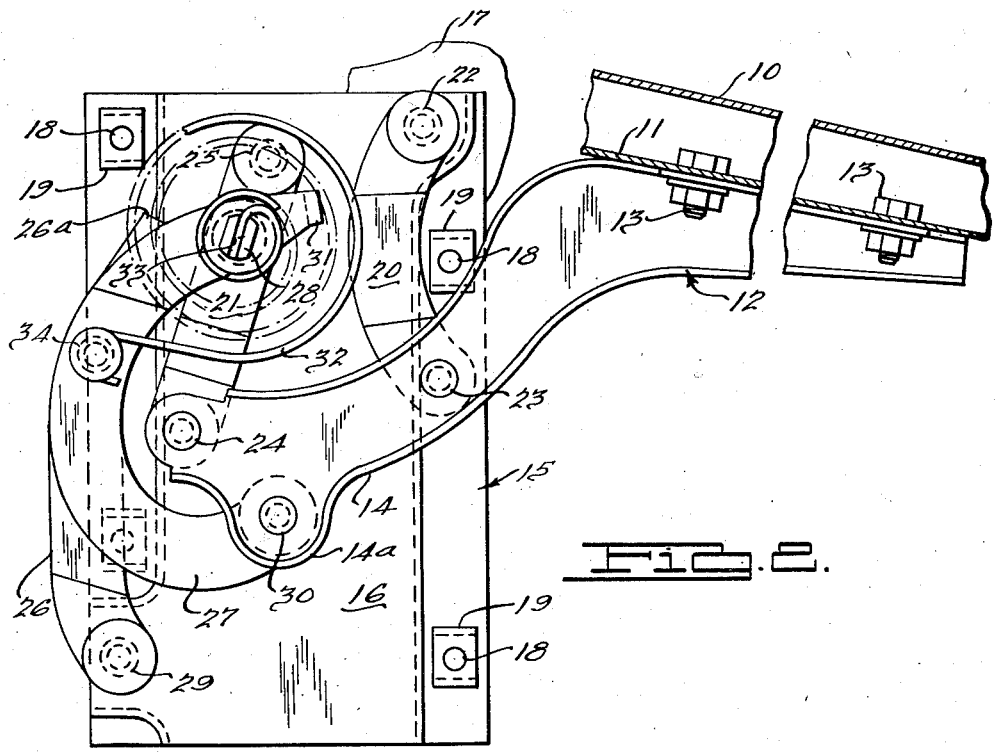
Fig. 2 is an enlarged fragmentary longitudinal section taken in the direction of the arrows substantially along the line 2—2 of Fig. 1, showing details of the hinge structure in the closed position of the lid.

During the initial stage of opening movement of the lid A from the closed position of Fig. 2, the link 21 will swing rearward or counterclockwise thereby shifting the pivot 24 in a generally horizontal direction rearwardly. During this initial motion of the link 21 and pivot 24 the link 20 will swing rearwardly and upwardly thereby shifting the pivot 23 in an upward direction. Thus, at the initial stage of opening movement the lid will be shifted bodily rearward as well as having a pivotal motion imparted thereto. Upon continued counterclockwise swinging of the links 20 and 21 to the raised or open position, both pivots 23 and 24 will move upward, raising the hinge arm and deck lid. In addition, rearward movement of the lower pivot 24 will be greater than the rearward movement of the pivot 23, so that the hinge arm and deck lid will continue to swing counterclockwise until the lid reaches the fully open position, Fig. 4. As a result, the lid A will swing simultaneously rearward and upward with a minimum of overall forward swinging. The difficulty of avoiding contact between a deck lid of considerable curvature and other portions of the vehicle body when the lid is in the raised position is accordingly eliminated.

Counterbalancing of the deck lid throughout its swinging movement is accomplished by spring urged toggle means including toggle links 26 and 27, referred to herein as a counterbalancing link and a connecting link respectively having adjacent ends pivotally connected by a pin 28. In the present instance, the lower end of the counterbalancing link 26 is pivotally connected to the plate 16 at 29 substantially below and forward of the links 20 and 21. When the lid is in the closed position, the link 26 extends from pivot 29 arcuately around the forward end of the hinge arm extension 14 to the pivot 28. Similarly, the connecting link 27 curves downward from the pivot 28 sharply around the forward end of extension 14 and is pivotally connected at 30 to a depending boss 14a of the extension 14. As indicated in Fig. 2, pivot 30 is located adjacent pivot 24 but below and rearward of the latter when the deck lid is in closed position, whereas pivot 28 lies substantially above pivots 29 and 30 on a vertical line passing therebetween. Thus the toggle is in folded condition when the lid A is in closed position and the pivots 29 and 30 are aligned to exert a rearward thrust on extension 14 in the direction of its movement from the closed to the open position of the lid. The links 26 and 27 are also dimensioned so as to unfold almost to a straightened condition, i. e. almost to a position of alignment of the pivots 28, 29 and 30, upon movement of the lid A to open position, Fig. 4. At the latter position, an offset movement limiting projection 31 of a forward extension of the link 27 beyond the pivot 28 engages a shoulder 26a of link 26 to prevent further unfolding of the toggle and opening of the deck lid.

The counterbalancing spring force applied to the toggle is effected by a torsion spring 32 having one end secured within a kerf 33 in an extension of the pivot 28, from which the spring 32 extends spirally outward clockwise under tension and terminates in a portion hooked around a retainer stud 34 projecting from the link 27 intermediate the pivots 28 and 30. Thus the toggle is yieldingly urged to an unfolded condition against the weight of the lid tending to swing the same to closed position.

By virtue of the hinge device shown, including the hinge arm extension 14 suspended from the links 20 and 21, the effective weight of the lid near the closed position tending to swing the links 20 and 21 clockwise approaches a minimum at the same time that the effective counterbalancing force of the spring urged toggle also approaches a minimum. As the lid swings upward toward the position of Fig. 4, its weight tending to swing the links 20 and 21 clockwise becomes increasingly effective, as likewise does the counterbalancing force of the straightening toggle. Accordingly by selecting a spring 32 of suitable tension and resiliency, the weight of the lid A will be approximately counterbalanced at all pivotal positions, so as to minimize the manual effort required either to raise or lower the lid. At the fully closed position of the lid A whereat the toggle is folded, the weight of the lid will readily overcome the toggle force and hold the lid against a fixed keeper to which it may be latched by conventional means. At the open position of the lid whereat the toggle is nearly straightened, a comparatively light spring force will positively and safely hold the lid in raised position without recourse to the usual deck lid stay or over-center toggle joint or the like. By reason of the stop 31, which prevents the toggle from unfolding completely to the straightened position, and the great leverage afforded by the rearward extension of the lid A, the same may be readily swung closed with slight manual effort when operated from the usual deck lid handle 35 located near the rearward portion of the lid, Fig. 1.

Figs. 5 through 7 illustrate a modification of the present invention also adapted particularly for use with the automobile rear deck lid A. A pair of hinge arms 12a comparable to the aforesaid arms 12 and bolted at 13 to the inner panel 11 are each formed with an offset portion 40 which extends generally horizontally forward at a level below the bolts 13 when the lid is in the closed position. Each hinge device is supported by means of a generally vertical bracket 41 comparable to the bracket 15 and secured to the body B by bolts 43.

Also similarly to the hinge suspension of the arm 12, the hinge arm extension 40 of the arm 12a at the closed position is hingedly suspended by a pair of swinging links 44 and 45 generally comparable to the links 20 and 21 and similarly pivoted at their upper ends by means of pivots 46 and 47 respectively to the bracket 41 and pivoted at their lower ends by means of pivots 48 and 49 respectively to the hinge arm extension 40, all substantially in the manner above described in connection with Figs. 1 through 4. In this instance however, the pivot 47 is keyed to the link 45 for pivoting therewith and is provided with a kerf 50 within which is fitted one end of a spiral torsion spring 51. The latter extends under tension spirally outward counterclockwise from the pivot 47, so as to urge the link 45 rearward or counterclockwise in Figs. 5 and 7, and is hooked at its outer end over a retainer 52 embossed from the bracket 41.

A lower counterbalancing link 53, slightly longer than the links 44 and 45, is keyed at its lower end to a pivot pin 54, which is pivotally connected to the bracket 41 substantially below the pivot 47 so that the hinge arm extension 40 in the closed position projects generally horizontally approximately midway between the pivots 47 and 54. The pivot 54 is provided with a kerf 55 within which is fixed one end of a torsion spring 56. The latter spirals outward clockwise from the pivot 54 under tension so as to urge the link 53 yieldingly rearward or clockwise in Figs. 5 and 7, and terminates in a portion hooked over a transverse retainer 57 of a bracket element 58 welded to the bracket 41. The upper end of link 53 is pivotally connected at 59 to one end of a connecting link 60, which in turn is pivotally connected at its other end at 61 to the link 44 intermediate the pivots 46 and 48.

As indicated in Fig. 5, the links 53 and 60 are approximately the same length and comprise a toggle having the joint 59 thereof located forward of the pivot 49 and approximately equidistant from the pivots 47 and 54 when the lid is in the closed position. Upon rearward swinging of the link 53 to the position of Fig. 7, the toggle links 53 and 60 unfold almost to positions of upright linear alignment to support the weight of the lid A positively in the raised position with a minimum counterbalancing force required of the spring 56. A transverse movement limiting projection 62 of a bracket 63 welded to the bracket 41 is provided to limit rearward swinging of the link 53 prior to straightening of the toggle, so that the lid A and hinge structure may be readily returned from the raised to the closed position merely by manual force exerted at the deck lid handle 35, Fig. 1.

By virtue of the hinge mounting of the arm 12a shown, the dual springs 51 and 56 cooperate to effect a substantially uniform counterbalancing action throughout the entire hinge movement. When the lid is near the closed position and the folded toggle is comparatively ineffectual as a counterbalance, the spring 51 at optimum tension and acting through link 45 substantially at right angles to the hinge arm extension 40 will exert its greatest counterbalancing effect. As spring 51 unwinds and its counterbalancing tension decreases upon raising of the lid, the straightening toggle 53, 60 will exert an increasing counterbalancing force and will gradually assume the primary load to be counterbalanced. Finally at the raised position, Fig. 7, a comparatively light spring force, as exerted by the partially unwound spring 56, will positively hold the lid against accidental closure. Thus one counterbalancing spring takes over where the other leaves off, so that the dual spring arrangement shown achieves a substantially uniform counterbalancing action over a greater range of hinge movement than would ordinarily be possible utilizing a single heavy spring.

I claim:
1. In a hinge device connecting a vehicle body with a rear deck lid to swing the lid between closed and raised positions, a hinge arm adapted to be rigidly secured to the lid and having an extension extending generally forward at the closed position of the lid, a pair of generally up- right swinging links spaced one behind the other when the lid is in the closed position, the upper end of each link being adapted to be pivotally connected to the body and the lower end of each link being pivotally connected to the hinge arm extension to swing the lid rearward from the closed to the raised position, the forward link being inclined rearward at the closed position of the lid, a counterbalancing link having one end adapted to be pivotally connected to the body at a location below said swinging links for swinging the other end forward and rearward, a connecting link pivotally connected to the other end of the counterbalancing link at a location above said hinge arm extension at the closed position of the lid and pivotally connected to said extension intermediate the pivotal connections of said swinging links with said extension, and spring means yieldingly urging the counterbalancing link pivotally rearward.

2. In a hinge device connecting a vehicle body with a rear deck lid to swing the same between closed and raised positions, a hinge arm adapted to be rigidly secured to the lid and having an extension extending generally forward at the closed position of the lid, a pair of generally upright swinging links spaced one behind the other when the lid is in the closed position, the upper end of each link being adapted to be pivotally connected to the body and the lower end of each link being pivotally connected to the hinge arm extension to swing the lid rearward and upward from the closed to raised position, the lower pivotal connection of the foremost link being located adjacent the forward end of said extension and below the lower pivotal connection of the rearmost link at the closed position of the lid, the upper pivotal connection of the foremost link being located rearward of the lower pivotal connection of that link and below the upper pivotal connection of the rearmost link at the closed position of the lid, a connecting link extending downwardly and arcuately around the forward end of the extension and pivotally connected thereto at a location below and rearward of the lower pivotal connection of the aforesaid foremost link when the lid is in the closed position, a counterbalancing link having an upper end pivotally connected to the upper end of the connecting link at a location above and rearward of the lower pivotal connection of the aforesaid foremost link when the lid is in the closed position and having a lower end adapted to be pivotally connected to the body at a location below and forward of the lower pivotal connection of the connecting link, and spring means yieldingly urging straightening of the angle between the pivotally connected counterbalancing link and connecting link.

3. In a hinge device connecting a vehicle rear deck lid to the vehicle body for swinging the lid to and from closed and raised positions, a pair of swinging links spaced one behind the other and each extending generally upright when the lid is in the closed position and having its upper end adapted to be pivotally connected to the body and its lower end adapted to be pivotally connected to the lid to swing the latter to the raised position, a counterbalancing link adapted to be pivotally connected at one end to the body below said links for swinging the other end forward and rearward, means to swing the lid to the raised position upon rearward swinging of the counterbalancing link comprising a connecting link pivotally connected to the other end of the counterbalancing link and to the rearmost of said swinging links intermediate the latter's pivotal connections with the body and lid, and spring means yieldingly urging the counterbalancing link pivotally rearward.

4. In a hinge device connecting a vehicle rear deck lid to the vehicle body for swinging the lid to and from closed and raised positions, a pair of swinging links spaced one behind the other when the lid is in the closed position and each disposed between and having an upper end adapted to be pivotally connected to the body and a lower end adapted to be pivotally connected to the lid to swing the latter to the raised position, a counterbalancing link adapted to be pivotally connected at one end to the body for swinging the other end forward and rearward, means to swing the lid to the raised position upon rearward swinging of the counterbalancing link comprising a connecting link pivotally connected to the other end of the counterbalancing link and to the rearmost of said swinging links intermediate the latter's pivotal connections with the body and lid, and spring means yieldingly urging the counterbalancing link pivotally rearward.

5. In a hinge device connecting a vehicle body with a rear deck lid to swing the lid between closed and raised positions, a hinge arm adapted to be rigidly secured to the lid and having a generally forward extension at the closed position of the lid, a pair of generally upright swinging links spaced one behind the other when the lid is in the closed position, the upper end of each link being adapted to be pivotally connected to the body and the lower end of each link being pivotally connected to the hinge arm extension to swing the lid rearward and upward from the closed to the raised position, the forward link being inclined rearward at the closed position of the lid, a counterbalancing link having one end adapted to be pivotally connected to the body at a location below said swinging links for swinging the other end forward and rearward, a connecting link pivotally connected to the other end of the counterbalancing link at a location above said hinge arm extension at the closed position of the lid and pivotally connected to the rearmost of said swinging links intermediate the pivotal connections thereof with the body and extension, and spring means yieldingly urging the counterbalancing link pivotally rearward.

6. In a hinge device connecting a vehicle body with a rear deck lid to swing the same between closed and raised positions, a hinge arm adapted to be rigidly secured to the lid and having a generally forward extension at the closed position of the lid, a pair of generally upright swinging links spaced one behind the other when the lid is in the closed position, the upper end of each link being adapted to be pivotally connected to the body and the lower end of each link being pivotally connected to the hinge arm extension to swing the lid rearward and upward from the closed to raised position, the lower pivotal connection of the foremost link being located adjacent the forward end of said extension and below the lower pivotal connection of the rearmost link at the closed position of the lid, the upper pivotal connection of the foremost link being located rearward of the lower pivotal connection of that link and below the upper pivotal connection of the rearmost link at the closed position of the lid, a connecting link having an upper end pivotally connected to the rearmost of said links intermediate the latter's pivotal connections with the body and hinge arm extension, a counterbalancing link having an upper forward end pivotally connected to the lower end of the connecting link at a location rearward of the lower pivotal connection of the aforesaid foremost link when the lid is in the closed position and having a lower rearward end adapted to be pivotally connected to the body at a location below said swinging links, and spring means engaged with said counterbalancing link to swing the upper forward end thereof rearward.

7. In a hinge device for a vertically swinging vehicle rear deck lid adapted to swing open at the rear end of the latter, a hinge arm member adapted to be rigidly secured to the lid to extend forward therefrom when the lid is closed, supporting means adapted to be rigidly secured to the vehicle body, a pair of swinging link members spaced longitudinally of the hinge arm member and suspending the latter from the supporting means when the lid is closed and having their upper and lower ends pivotally connected respectively to the supporting means and hinge arm member, a counterbalancing link pivotally connected at one end to the supporting means below said swinging link members to swing forward or rearward, a connecting link pivotally connected to the other end of the counterbalancing link and to one of said members, and spring means including a torsion spring having one of its ends connected to one of said link members and yieldingly urging the counterbalancing link pivotally rearward.

8. In a hinge device for a vertically swinging vehicle rear deck lid adapted to swing open at the rear end of the latter, a hinge arm member adapted to be rigidly secured to the lid to extend forward therefrom when the lid is closed, supporting means adapted to be rigidly secured to the vehicle body, a pair of swinging link members spaced longitudinally of the hinge arm member and suspending the latter from the supporting means when the lid is closed and having their upper and lower ends pivotally connected respectively to the supporting means and hinge arm member, a counterbalancing link having a lower end pivotally connected to the supporting means below said swinging link members to swing its upper end between forward and rearward positions, a connecting link pivotally connected to said upper end of the counterbalancing link and to one of said members, said upper end of the counterbalancing link being at said forward position when the lid member is closed, and spring means including a torsion spring having one of its ends connected to one of said link members and yieldingly urging the upper end of the counterbalancing link pivotally rearward.

9. In a hinge device for a vertically swinging vehicle rear deck lid member adapted to swing open and closed at its rear end, a pair of swinging link members spaced longitudinally of the vehicle body and having upper and lower ends when said lid member is closed, the upper and lower ends respectively of said swinging link members being adapted to be pivotally connected respectively to the vehicle body and to forward portions of said lid member, a counterbalancing link having a lower end adapted to be pivotally connected to the body below the swinging link members to swing its upper end between forward and rearward positions, a connecting link pivotally connected to the upper end of the counterbalancing link and to one of said members, the upper end of the counterbalancing link being at said forward position when the lid member is closed, and spring means including a torsion spring having one of its end connected to one of said link members and yieldingly urging the upper end of the counterbalancing link pivotally rearward.

10. In a hinge device for a vertically swinging vehicle rear deck lid adapted to swing open and closed at the rear end of the latter, a hinge arm adapted to be rigidly secured to the lid to extend forward therefrom when the lid is closed, supporting means adapted to be rigidly secured to the vehicle body, means suspending the hinge arm from the supporting means when the lid is closed comprising a pair of swinging links spaced longitudinally of the hinge arm and pivotally connected at their upper and lower ends respectively to the supporting means and hinge arm, a counterbalancing link having a lower end pivotally connected to the supporting means to swing its upper end between forward and rearward positions, the pivotal connection of said lower end of the counterbalancing link being located below and forward of the pivotal connection of the foremost swinging link with said hinge arm when the lid is closed, the upper end of said counterbalancing link being at said forward position and above and rearward of the pivotal connection of said foremost swinging link with the hinge arm when the lid is closed, a connecting link pivotally connected to said upper end of the counterbalancing link and to said hinge arm, and spring means yieldingly urging the upper end of the counterbalancing link rearward.

11. In a hinge device for a vertically swinging vehicle rear deck lid adapted to swing open and closed at the rear end of the latter, a hinge arm adapted to be rigidly secured to the lid to extend forward therefrom when the lid is closed, supporting means adapted to be rigidly secured to the vehicle body, a pair of swinging links suspending the hinge arm from the supporting means and spaced longitudinally of the hinge arm when the lid is closed and having their upper and lower ends pivotally connected respectively to the supporting means and hinge arm, a counterbalancing link having a lower end pivotally connected to the supporting means to swing its upper end between forward and rearward positions, the pivotal connection of said lower end of the counterbalancing link being located below the lower ends of said swinging links when the lid is closed, the upper end of said counterbalancing link being at said forward position when the lid is closed, a connecting link pivotally connected to said upper end of the counterbalancing link and to the rearmost of the swinging links at the closed position of the lid, the counterbalancing and connecting links extending generally rearwardly from their common pivotal connection to their respective pivotal connections with the supporting means and rearmost link when the lid is closed, and spring means yieldingly urging the upper end of the counterbalancing link pivotally rearward.

12. In a hinge device for a vertically swinging vehicle rear deck lid adapted to swing open and closed at the rear end of the latter, a hinge arm adapted to be rigidly secured to the lid to extend forward therefrom when the lid is closed, supporting means adapted to be rigidly secured to the vehicle body, means suspending the hinge arm from the supporting means when the lid is closed comprising a pair of swinging links spaced longitudinally of the hinge arm and pivotally connected at their upper and lower ends respectively to the supporting means and hinge arm, a counterbalancing link having a lower end pivotally connected to the supporting means to swing its upper end between forward and rearward positions, the pivotal connection of said lower end of the counterbalancing link being located below the lower end of the foremost of said swinging links when the lid is closed, the upper end of said counterbalancing link being at said forward position when the lid is closed, a connecting link pivotally connected to said upper end of the counterbalancing link and to the rearmost of the swinging links at the closed position of the lid, the counterbalancing link declining rearwardly and the connecting link inclining rearwardly from their common pivotal connection to their respective pivotal connections with the supporting means and rearmost link when the lid is closed, and spring means yieldingly urging the upper end of the counterbalancing link pivotally rearward.

13. In combination, supporting means, a vertically swinging member, means for swinging said member forwardly and rearwardly including a pair of link members spaced one behind the other and having upper and lower ends pivotally connected respectively to the supporting means and swinging member to suspend the latter at a lowered position, a counterbalancing link pivotally connected at one end to the supporting means below said link members to swing forwardly and rearwardly, a connecting link pivotally connected to the other end of the counterbalancing link and to one of said members, and spring means yieldingly urging the counterbalancing link pivotally rearward, the pivotal connection between said counterbalancing link and connecting link, when the swinging member is at said lowered position, being above the pivotal connections between said link members and swinging member and likewise the pivotal connection between said connecting link and member being intermediate the pivotal connections between said link members and swinging member.

14. In combination, supporting means, a vertically swinging member, means for swinging said member forwardly and rearwardly including a pair of link members spaced one behind the other and having upper and lower ends pivotally connected respectively to the supporting means and swinging member to suspend the latter at a lowered position, a counterbalancing link pivotally connected at one end to the supporting means below said link members to swing forwardly and rearwardly, a connecting link pivotally connected to the other end of the counterbalancing link and to the rearmost of said link members, and spring means yieldingly urging the counterbalancing link pivotally rearward, the pivotal connection between said counterbalancing link and connecting link, when the swinging member is at said lowered position, being above the pivotal connections between said link members and swinging member.

15. In combination, supporting means, a vertically swinging member, means for swinging said member forwardly and rearwardly including a pair of link members spaced one behind the other and having upper and lower ends pivotally connected respectively to the supporting means and swinging member to suspend the latter at a lowered position, a counterbalancing link pivotally connected at one end to the supporting means below said link members to swing forwardly and rearwardly, a connecting link pivotally connected to the other end of the counterbalancing link and to one of said members, and spring means including a torsion spring having one of its ends connected to one of said link members and yieldingly urging the counterbalancing link rearwardly.

References Cited in the file of this patent

UNITED STATES PATENTS

| | | |
|---|---|---|
| 2,063,686 | Lefevre | Dec. 8, 1936 |
| 2,091,673 | De Orlow | Apr. 31, 1937 |
| 2,154,733 | De Orlow | Apr. 18, 1939 |
| 2,162,135 | Tell | June 13, 1939 |
| 2,175,577 | Soss | Oct. 10, 1939 |
| 2,612,651 | Roethel | Oct. 7, 1952 |